Dec. 11, 1962  S. G. NEVIUS  3,068,457
DISPLACEMENT MEASURING DEVICE
Filed Nov. 1, 1957  5 Sheets-Sheet 1

INVENTOR.
SEARLE G. NEVIUS
BY
R. E. Geangue
Attorney

Dec. 11, 1962 S. G. NEVIUS 3,068,457
DISPLACEMENT MEASURING DEVICE
Filed Nov. 1, 1957 5 Sheets-Sheet 3

INVENTOR.
SEARLE G. NEVIUS
BY
R. E. Geanque
Attorney

Dec. 11, 1962 S. G. NEVIUS 3,068,457
DISPLACEMENT MEASURING DEVICE
Filed Nov. 1, 1957 5 Sheets-Sheet 4

INVENTOR.
SEARLE G. NEVIUS
BY
R. E. Granque
Attorney

Dec. 11, 1962  S. G. NEVIUS  3,068,457
DISPLACEMENT MEASURING DEVICE
Filed Nov. 1, 1957  5 Sheets-Sheet 5

INVENTOR.
SEARLE G. NEVIUS
BY R.E. Geauque
Attorney

United States Patent Office 3,068,457
Patented Dec. 11, 1962

3,068,457
DISPLACEMENT MEASURING DEVICE
Searle G. Nevius, Tujunga, Calif., assignor to Telecomputing Corporation, North Hollywood, Calif., a corporation of California
Filed Nov. 1, 1957, Ser. No. 694,044
16 Claims. (Cl. 340—200)

This invention relates to measuring apparatus and more particularly to displacement measuring apparatus which produce electrical output signals as a function of mechanical displacement by phase measuring techniques.

Electrical measuring instruments for resolving mechanical displacements, either linear or angular, into electrical output signals providing a measure of the displacement have previously been proposed. In general, prior devices are comprised of stationary windings and relatively movable windings mutually coupled either capacitively or inductively. In these prior instruments variations in electrical coupling between the two members due to relative movement normally is measured by applying a driving signal to one of the relatively movable windings and observing or detecting the amplitude of the signal generated in the complementary winding as a measure of the relative displacement of the two elements.

A typical prior resolver of capacitively coupled type is disclosed in U.S. Patent No. 2,674,729 to Carter, and transducers having inductive coupling are disclosed in U.S. Patent Nos. 2,650,352 and 2,671,892 to Childs.

Prior displacement resolving instruments such as are described in the foregoing are subject to a number of weaknesses and disadvantages seriously detracting from their accuracy of measurement and desirability of use. Probably the most troublesome effect arises by reason of the fact that in prior resolvers electrical output intelligence is in the form of amplitude modulation, and output signal amplitudes as actually obtained in such resolvers may be influenced directly or indirectly by many factors other than displacement of one resolver element with respect to the other. While the effects of certain of these sources of error can be minimized by careful design and use, the effects of other sources of error are difficult or impossible to control and all sources of error limit the inherent accuracy of measurement possible with the instrument.

Another important source of inaccuracy in prior resolvers of inductively coupled type lies in the inherent distributed capacitance between elements of the resolver, particularly between the driver and sensor elements thereof, and undesired variations in distributed capacitance between the relatively movable elements. These undesired capacitances and variations thereof cause capacitance voltages to appear as a component of the output signal voltage. Thus, the output signal voltage amplitude variation is related to the inductive coupling variation only to the extent by which the desired inductive coupling effect exceeds the undesired capacitive coupling effect. Changes in distributed capacitance are relatively large in those prior resolvers because of the large and changing area of overlay of the conductor elements of the driver and sensor elements.

Yet another source of inaccuracy found in some prior resolvers is caused by slight eccentricity of the elements in a circular configuration or slight misalignment in a linear arrangement. In these prior resolvers such irregularities cause first order inaccuracies to appear in the resolver output.

Prior resolvers designed to operate so as to produce amplitude variations to convey output intelligence have the disadvantage inherent in all amplitude varying signals in that the noise level of the system limits the ultimate resolution of the instrument.

Another inherent disadvantage of prior resolvers is the ambiguity of output intelligence resulting from multiple configuration. Thus, to resolve such ambiguity in prior instruments it is necessary to resort to a supplementary device.

It is the principal purpose and object of the present invention to provide electrical measuring instruments of the general type described in the foregoing, but free from the above-enumerated and other disadvantages of such prior instruments. This objective is realized in the measuring apparatus of the invention primarily by arrangement of the condutor elements of the resolver driver and sensor elements in a manner to provide substantially constant coupling, both electric and magnetic, between driver and sensor elements so that the amplitude of the output electrical signal will remain substantially constant for varying relative positions of the rotor and stator elements. This apparatus in its plurality of embodiments provides an extension of the present limits on the ease and accuracy of precision measurements. The present arrangement is designed to produce phase modulated output signals as a function of the relative displacement of the rotor and stator units. This and other aspects of the invention significantly contributing to accomplishment of its purpose will be fully disclosed hereinafter.

Advantages of resolver construction and operation in accordance with the invention are many and important. For example, since capacitive and magnetic coupling are held constant even on relative movement of the rotor and stator elements, the improved resolvers provide accuracy and reliability of measurement unobtainable with prior instruments.

Another important advantage of the improved resolvers is the feasibility of use of high frequency input and output signals, which enables selection of frequencies and resolver design parameters so as to obtain a 2 $\pi$ radian delay (sub-multiple or multiple thereof) over a distance along the resolver windings equal to desired unit displacement. High frequency electrical input and output signals of one or more frequencies, at least one of which provides the required delay, may be employed, as more fully explained hereinafter.

Another advantage of this invention derives from the aforementioned 2 $\pi$ radian time delay. Since resolution of high degree is possible for each pole pair from primary phase intelligence, the secondary phase intelligence derived from the 2 $\pi$ radian time delay permits a non-ambiguous range of information to be obtained over a spatial displacement of a multiple of pole pairs with a precision equal to that obtained over one pole pair of spatial displacement.

The phase modulated output signal which is characteristic of the resolvers of this invention is inherently desirable as compared to amplitude modulated signals because it can be more easily, and far more accurately, resolved and digitized, and also because it is adapted to use with digitizing systems requiring a phase modulated input such, for example, as certain of the improved digitizing systems disclosed in my copending application Serial No. 693,930 filed November 1,, 1957.

Accordingly, it is a primary object of the invention to provide new and improved measuring instruments for electrically resolving angular and linear mechanical displacements.

It is another object of the invention to provide new and improved displacement measuring devices wherein the electrical output signals are phase modulated with respect to a cyclical input or other reference signal wherein said phase modulation is a defined function of the displacement.

Still another object of the invention is the provision of novel displacement resolving and measuring instruments including relatively movable rotor and stator elements and characterized by constant total distributed capacity between these elements and minimum variation of such capacity with variation in displacement of one element with respect to the other.

Also an object of the invention is the provision of new and improved displacement measuring devices for resolving mechanical displacement into electrical output signals, wherein total electrical coupling remains constant throughout the entire range of displacement of the instrument, and wherein the electrical output remains substantially constant in amplitude over this entire range of displacement, and wherein the output intelligence is contained entirely in a phase modulated carrier.

A further object of this invention is the provision of novel electrical measuring devices providing both "coarse" and "fine" indication with but one set of apparatus. Such "fine" indication to be intelligence relating to displacement over a small increment to a high degree of precision, and the "coarse" indication to be intelligence which prevents ambiguity over a displacement range containing a plurality of such increments.

Yet another object is the provision of novel electrical measuring devices for electrically resolving mechanical displacements adapted to use at electrical wave frequencies such that a selected frequency will provide a signal time delay of 2 π radians over a spatial displacement equal to a desired unit length.

It is also an object of the invention to provide new and improved displacement and resolving and measuring instruments having transmission line type resolver elements, properly terminated so as to minimize standing waves and resultant systematic error.

These and other objects, features and advantages of the invention will become more fully apparent by reference to the appended claims and the following detailed description when read in conjunction with the accompanying drawings, wherein:

Figure 1:
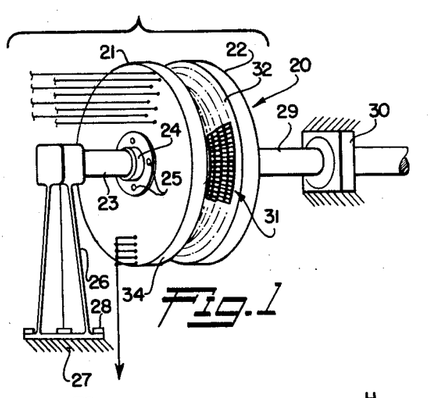
FIGURE 1 is a perspective view of one embodiment of the invention showing the rotor and stator and the pattern on the rotor.

Referring to the embodiment of the invention illustrated in FIGURE 1, the resolver 20 comprises a stator 21 and a rotor 22, each of which can be fabricated of any material, such as glass or plastic, which retains its dimensions under a wide variety of environmental conditions. The stator 22 is secured to a rod 23 by a collar member 24 which is secured to the back surface of the stator by a plurality of bolts 25. Rod 23 is also secured to a fixed standard 26 attached to a suitable support 27 by bolts 28. The rotor 22 is secured to rotatable shaft 29 by a collar similar to collar 24 and the shaft is supported for rotation by a bearing block 30 secured to a suitable support. A pattern 31 formed in a thin layer of conducting material, such as copper, is placed on the inner face 32 of the rotor and a pattern 33 formed in similar material is placed on the inner face 34 of stator 21. In FIGURE 1, the rotor and stator are shown separated and it is understood that minimum spacing will be present between these members after assembly of the resolver.

Figure 2:
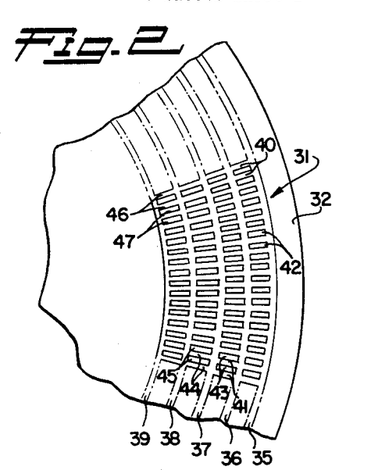
FIGURE 2 is an enlarged plan view of the pattern on the rotor.

Referring to FIGURE 2, the pattern 31 of the rotor comprises metal rings 35—39 which are concentric with the center of the rotor. A plurality of evenly spaced radial bars 40 of the same size extend between rings 35 and 36 and a plurality of identical bars 41, in the same radial line with bars 40, extend between rings 37 and 38. The bars 40 define a plurality of openings 42 of the same size as the bars and likewise, the bars 41 define a plurality of openings 43 of the same size as the bars 41. The bars 40 and 41 and openings 42 and 43 form one part of the rotor pattern as will be explained. In a similar manner, identical radial bars 44 define openings 45 of the same size as the bars 44, between rings 37 and 38 and identical bars 46 in line with bars 44 define openings 47 of the same size as the bars 46, between rings 38 and 39. The bars 44 and 46 and openings 45 and 47 form the other part of the rotor pattern. In order to obtain the vernier action later described, the number of bars 40, 41 is different by a selected amount from the number of bars 44, 46 and in the pattern illustrated, there are two hundred of the bars 40, 41 and one hundred ninety-eight of the bars 44, 46.

Figure 3:
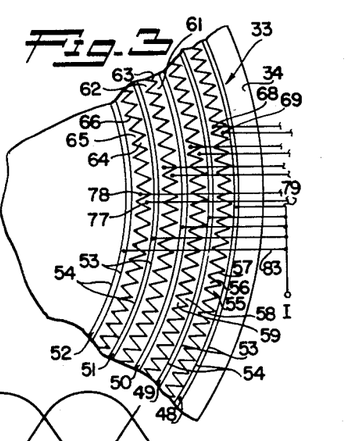
FIGURE 3 is an enlarged plan view of the pattern on the stator positioned opposite to the pattern on the rotor.
Figure 4:
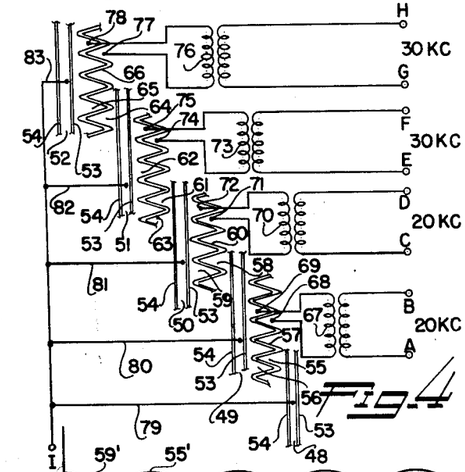
FIGURE 4 is a schematic illustration of the power supply to and the output from the various elements of the stator pattern.

Referring to FIGURES 3 and 4, the pattern 33 of the stator 21 has five conducting rings 48–52 which are concentric with the center of the stator. Each ring is totally insulated from the remainder of the pattern by circular spaces 53 and 54 on opposite sides of each ring. These spaces are illustrated in FIGURE 4 but are shown only as lines in FIGURE 3 because of their small radial width. Located between rings 48 and 49 and insulated therefrom by spaces 53 and 54 are two conducting elements 55 and 56 which are insulated from one another by a space 57 which is approximately sinusoidal in shape and extends completely around the pattern 33. Likewise, conducting elements 58 and 59 are located between rings 49 and 50 and are insulated from each other by space 60 and from the rings by spaces 53 and 54. The space 60 has the same shape as space 57 and contains the same number of sinusoids but the sinusoids are out of phase by 90 electrical degrees as will be later explained. Conducting elements 55, 56, 58 and 59 comprise one part of the stator pattern. For purposes of discussion, one sinusoid of space 57 or 60 will be designated as 360 electrical degrees as distinguished from degrees of mechanical rotation of the rotor.

In a similar manner, conducting elements 61 and 62 are located between rings 50 and 51 and separated by sinusoidal space 63 while conducting elements 64 and 65 are located between rings 51 and 52 and separated by sinusoidal space 66. Each element is also insulated from the adjacent ring by either a space 53 or 54. Spaces 63 and 66 are of the same shape and contain the same number of sinusoids but the sinusoids are out of phase by 90 electrical degrees. The other part of the stator pattern includes conducting elements 61, 62, 64 and 65. The spaces 57, 60, 63 and 66 are illustrated in FIGURE 4 but are shown only as lines in FIGURE 3 because of their small radial width. As is apparent, the bars 40, 41, 44 and 46 are directly opposite the spaces 57, 60, 63 and 66, respectively, when the two patterns are positioned adjacent each other. The circumferential width of each bar and of each adjacent opening in the rotor pattern corresponds with π radians of the opposite sinusoid so that one bar and one opening are opposite a sinusoid. Thus, spaces 57 and 60 contain 200 full sinusoids and spaces 63 and 64 contain 198 full sinusoids.

As can be seen, a balanced configuration is obtained by fitting the sinusoidal areas in "jig-saw puzzle" fashion with a minimum of insulating area between the two patterns. The use of two such balanced pairs provides a space-quadrature arrangement. The output from all four patterns may be coupled by a single bar conductor as will be hereinafter explained. The area of any single driver pattern conductor under a given coupler conductor bar varies sinusoidally with displacement and thereby provides, at least to a first order, a sinusoidal variation of capacity versus displacement. The sinusoidal elements 55 and 56 and 58 and 59 are powered with a reference carrier at 20 kc. Sinusoidal patterns 61, 62 and 64, 65 are powered by a reference carrier at 30 kc. The reference carrier is voltage supplied and the resolver is dependent for its operating characteristics upon the proper disposition of its elements of electric field. Electrostatic couplings from the powered sinusoidal patterns to the output conductor patterns 48, 49, 50, 51 and 52 is achieved by means of the conductor bars 40 and 46 of the rotor.

The use of a 20 kc. and a 30 kc. reference carrier permits the two output signals to be linearly mixed and provide a composite output signal which may be easily transmitted via a single channel link to companion indicating or utilizing apparatus. The composite signal may be separated by means of conventional selective filter circuitry at a convenient point in the utilization apparatus.

Figure 5:
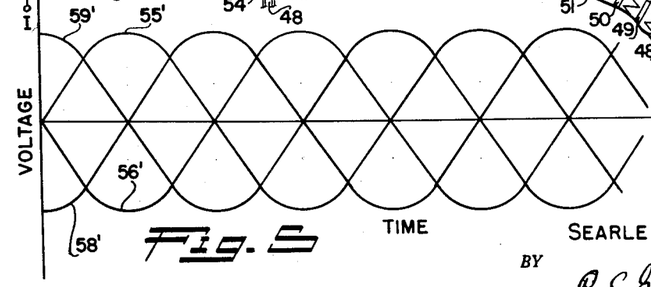
FIGURE 5 is a graphical illustration of the phase relationship of the four electrical inputs to one part of the stator.

The electrical input circuit for the stator pattern is illustrated in FIGURE 4. Terminals A and B are connected with a high frequency (e.g. 20 kc.) source and are coupled with inductance 67 which in turn supplies a high frequency input to terminals 68 and 69 on conducting elements 55 and 56, respectively. In a similar manner, the high frequency input across terminals C and D and inductance 70 produces a high frequency input to conducting elements 58 and 59 at terminals 71 and 72, respectively. The inputs at terminals A, B and at terminals C, D are of the same amplitude and frequency but are out of phase by 90 electrical degrees. Also, because of inductances 67 and 70, a phase difference of 180 electrical degrees exists between terminals 68 and 69 and between terminals 71 and 72. If the phase at terminal 68 on conducting element 55 is taken as the reference, the curves 55', 56', 58', and 59' of FIGURE 5 illustrates the input to conducting elements 55, 56, 58 and 59, respectively, and show the phase relationship existing between these conducting elements. It is apparent that the phase at elements 58, 56, and 59 lag the phase at element 55 by 90, 180 and 270 electrical degrees respectively.

Referring again to FIGURE 4, the terminals E and F and inductance 73 supply high frequency inputs (e.g. 30 kc.) to terminals 74 and 75 of conducting elements 61 and 62, respectively, and terminals G and H and inductance 76 supply high frequency inputs to terminals 77 and 78 of conducting elements 64 and 65, respectively. The inputs at terminals E, F and at terminals G, H are of the same amplitude and frequency but are out of phase by 90 electrical degrees. Also, because of inductances 73 and 76, a phase difference of 180 electrical degrees exists between terminals 74 and 75 and between terminals 77 and 78. Thus, the phase relationship between the inputs to conducting elements 61, 62, 64 and 65 is also of the form represented by FIGURE 5. If the phase of the input at element 61 is used as the reference, the phase at elements 64, 62, and 65 would lag by 90, 180, and 270 electrical degrees respectively.

The output of the resolver is present at the single terminal I which connects with lines 79—83 leading, respectively, to rings 48—52. In the operation of the resolver, the conducting elements of the stator pattern are electrostatically coupled to the adjacent bars of the rotor pattern and the rings 35—39 of the rotor pattern are electrostatically coupled to the output rings 48—52 of the stator pattern since these rings are adjacent one another. Thus, the lines 79—83 can only be connected all together if the input frequency at terminals A, B and C, D is different from the input frequency at terminals E, F and G, H. For purposes of discussion, the input to terminals A, B and C, D will be 20 kc. and the input to terminals E, F and G, H will be 30 kc. In the event the inputs are of the same frequency, separate circuits connected to rings 48, 49 and 50 and to rings 50, 51 and 52 would be required.

By arranging the balanced pairs of conductors 55, 56 and 58, 59 in space-quadrature, the sinusoidal variation of capacity versus displacement of each pair can be made additive to give a net coupling of unity in the amplitude domain whereas the point (in time) at which coupling takes place may be made dependent on spatial displacement. In this way, amplitude modulation of the output signal as appears on line I may be made negligible.

Figures 6, 7, 8:
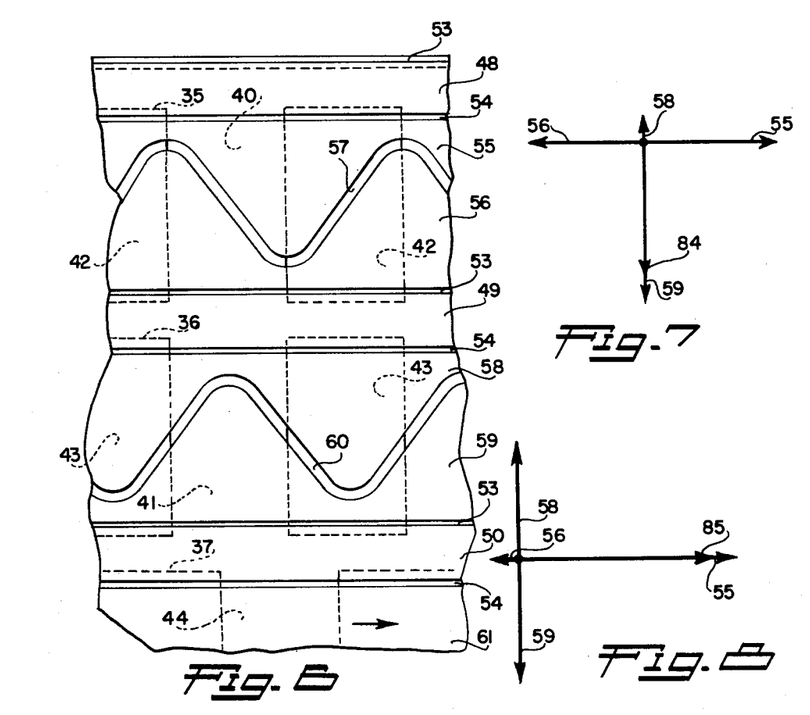
FIGURE 6 is a diagrammatic illustration of the relationship between the rotor and stator patterns for one part of the resolver at a selected relative position.
FIGURE 7 is a vector diagram showing the effect of the four electrical inputs on the phase of the resultant output from one part of the resolver.
FIGURE 8 is a vector diagram illustrating the resultant phase of the output after movement of the rotor relative to the stator by 90 electrical degrees in the direction of the arrow in FIGURE 6.

In FIGURE 6, the relationship of the bars and rings of the rotor pattern to the conducting elements and rings of the stator pattern are illustrated by showing the stator pattern in full lines and the rotor pattern in dotted lines. Only sinusoidal spaces 57 and 60 and their associated conducting elements are shown since these elements co-operate to produce a signal whose phase changes with respect to the phase of a reference signal upon movement of the rotor. The elements of the resolver not shown in FIGURE 6 produce a second phase signal in the same manner as will now be described for the illustrated elements. It will be apparent that the input to any one of the conducting elements 55, 56, 58, 59 can be used as the phase reference, and for purposes of discussion, the input to element 59 will be selected as the reference. Also, as previously stated, one sinusoid of either space 57 or 60 is equivalent to 360 electrical degrees.

As illustrated in FIGURE 6, the sinusoids of space 57 lead the sinusoids of space 60 by 90 electrical degrees and the bars 40 and 41 of the rotor pattern are opposite 180 electrical degrees of both spaces. Bars 40 are electrostatically coupled with the adjacent areas of conducting elements 55 and 56 on opposite sides of space 57 and in the position of FIGURE 6, these areas are equal. Also, bars 41 are electrostatically coupled with the adjacent areas of conducting elements 58 and 59 on opposite sides of space 60 and in the position of FIGURE 6, the adjacent area of element 59 is larger than the area of element 58. The combined effect of the four areas is illustrated by the vector diagram of FIGURE 7, wherein the phase vectors are designated with the reference numeral of the corresponding conducting element. As previously stated, the inputs to elements 55 and 56 are 180 electrical degrees out of phase and since the areas of these elements adjacent bars 40 are equal, the signals coupled to bars 40 cancel one another. Also, the inputs to elements 58 and 59 are 180 electrical degrees out of phase and since the areas of these elements adjacent bars 41 are unequal, the output signal in bars 41 are unequal. The output signal in bars 41 is represented by vector 84 and is in phase with the input to element 59 which has been chosen as the phase reference. The resultant output signal coupled to bars 40 and 41 is also electrostatically coupled to rings 48, 49 and 50 of the stator pattern by rings 35, 36 and 37 of the rotor pattern and the rings 48, 49 and 50 are in turn connected to the output terminal I by lines 79, 80 and 81.

Figure 9:
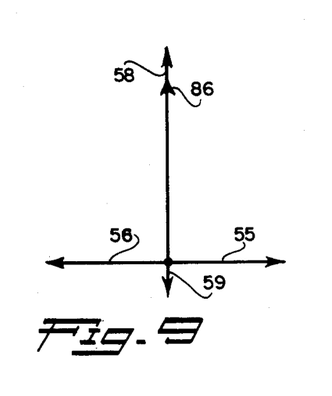
FIGURE 9 is a vector diagram illustrating the resultant phase of the output after movement of the rotor relative to the stator by 180 electrical degrees in the direction of the arrow in FIGURE 6.
Figure 10:
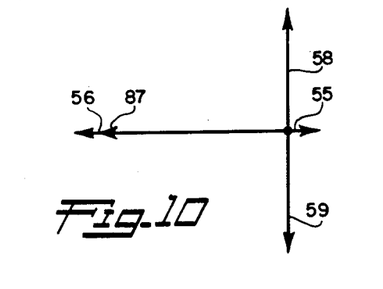
FIGURE 10 is a vector diagram illustrating the resultant phase of the output after movement of the rotor relative to the stator by 270 electrical degrees in the direction of the arrow in FIGURE 6.

After the rotor 22 has rotated 90 electrical degrees in the direction of the arrow in FIGURE 6, the areas of elements 55 and 56 adjacent bars 40 become unequal with the area of element 55 being the larger and the areas of elements 58 and 59 adjacent bars 41 become equal. The net effect of these areas results in the vector 85 of FIGURE 8 which illustrates that the phase of the output signal at terminal I has been shifted 90 electrical degrees with respect to the phase of the reference signal. Another 90 electrical degrees of rotation of the rotor (making a total of 180 degrees) results in equal areas of elements 55 and 56 and in an area of element 58 larger than the area of element 59 so that the vector 86 of FIGURE 9 represents the output signal which is out of phase with the reference signal by 180 electrical degrees. Another 90 electrical degrees of rotation of the rotor (making a total of 270 degrees) results in equal areas of elements 58 and 59 and in an area of element 56 larger than the area of element 55 so that the vector 87 of FIGURE 10 represents the output signal which is out of phase with the reference signal by 270 electrical degrees. After 360 electrical degrees, the vector 84 again represents the output signal which is back in phase with the reference signal. It is understood that vector for the output signal continually changes in direction during rotation of the rotor as indicated by the vector diagrams for the four selected relative positions between the rotor and stator and the phase of the output signal is shifted 360 degrees during 360 electrical degrees of movement between the rotor and stator. However, the frequency of the output signal remains the same as the four input signals, which has been designated as 20 kc.

In a similar manner, a second output signal of changing phase results from the coupling of the adjacent areas of elements 61 and 62 with bars 44 of the rotor and from the coupling of the adjacent areas of elements 64 and 65 with bars 46 of the rotor. This second output signal is connected with output terminal I through leads 81, 82 and 83 and has the same frequency as the inputs to elements 61, 62, 64 and 65, namely 30 kc. The phase of the second output signal relative to the phase of the reference signal will change 360 electrical degrees during movement of the rotor through 360 electrical degrees of the sinusoidal wave spaces 63 and 66. However, since the spaces 57 and 60 contain 200 wave lengths and the spaces 63 and 66 contain 198 wave lengths, the output signal from lines 79, 80, 81 will go through 200 cycles of 360° phase shift and the output signal from lines 81, 82, 83 will go through 198 cycles of 360° phase shift for each complete revolution of 360 mechanical degrees by the rotor. Because of the difference in number of the bars 40, 41 and 44, 46 these two sets of bars are not in alignment over the rotor pattern and change in relative position at locations around the pattern.

Figure 11:
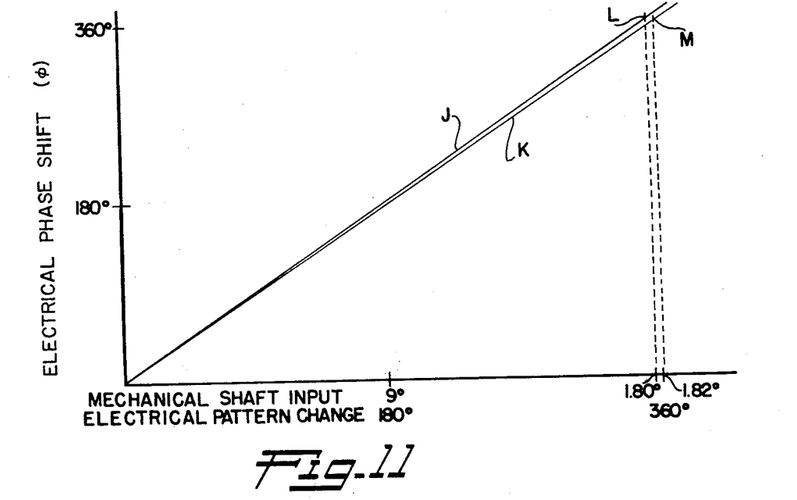
FIGURE 11 is a graphical illustration of the phase shift in electrical degrees for the two separate parts of the resolver during rotation of the rotor.

Looking now at FIGURE 11 line J represents the phase shift versus displacement of the output signal obtained from elements 55, 56 and elements 58, 59. Line K represents the phase shift versus displacement of the output signal obtained from elements 61, 62 and 64, 65. It is apparent that a 360° electrical phase shift represented by point L on line J results upon 1.8 mechanical degrees rotation of the rotor while the same electrical phase shift as represented by point M on line K results upon approximately 1.82 mechanical degrees rotation of the rotor. Thus, during rotor movement, the vertical distance between lines J and K continually increases so that the phase difference between the outputs from elements 55, 56, 58, 59 and elements 61, 62, 64 and 65 continually increases. After 180 degrees mechanical rotation of the rotor, this phase difference will be 360 electrical degrees and for each complete 360 degrees mechanical rotation of the rotor, the two outputs will go through two revolutions of phase change corresponding to 720 electrical degrees.

Since the output from the balanced elements 55, 56 and 58, 59 is derived from a sinusoidal pattern having two more cyclical waves than the output from balanced elements 61, 62 and 64, 65, the output from the second set of phase-quadrature patterns may be used to operate upon the output from the first set of phase-quadrature patterns to subtract all but two cyclical phase revolutions per single turn of the input shaft 29. This will provide a "coarse" signal which may be used to prevent ambiguity in reading or identifying the phase advancement over each individual cyclical wave of the resolver pattern and thus produce a "fine" signal.

Figure 12:
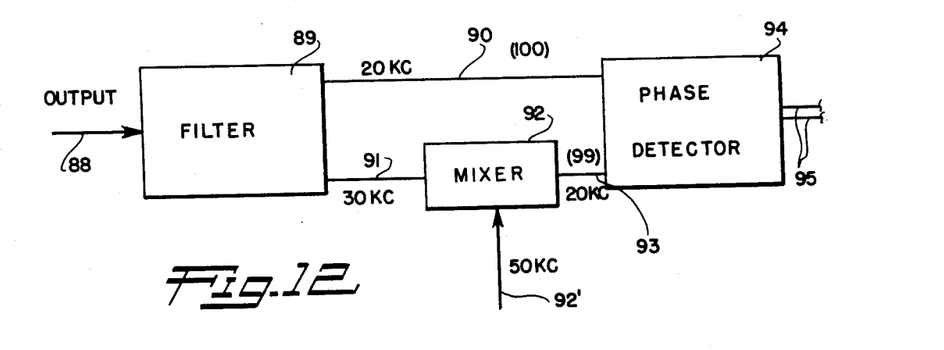
FIGURE 12 is a schematic circuit for detecting the difference in phase between the two outputs of the resolver.

Referring now to FIGURE 12 there is shown circuit means whereby the coarse signal may be obtained from the two outputs from the resolver. The composite signal containing the phase shifted output signals from both sections of the resolver is supplied on line 88 to selective filter 89. This harmonic filter comprises LC selective circuits which separates the phase shifted itelligence signals and supplies them on separate lines 90 and 91. The 20 kc. signal on line 90 represents 100 cyclical phase revolutions for each 180 degrees of shaft angle rotation of the resolver while the 30 kc. signal on line 91 represents 99 cyclical phase revolutions for each half turn of the input shaft. The signal on line 91 is heterodyned with a 50 kc. reference carrier 92' in mixer 92 and thereby provides an output intelligence carrier on line 93 which has the same frequency, namely 20 kc., as the intelligence carrier on line 90. These two lines 90 and 93 supply the two intelligence carriers to phase detector 94. This phase detector produces two push-pull in-quadrature voltages whose relative magnitudes are always proportional to the phase relationship between the applied 20 kc. input signals. Since the signal appearing on line 93 serves as the reference carrier for the intelligence carrier on line 90 the phase relationship will provide only one cyclical change of the phase quadrature signals on lines 95 for each 180 degrees of revolution of the input shaft of the resolver. If the fixed 20 kc. reference carrier applied to the resolver were to be supplied on line 93 then the phase quadrature voltages on lines 95 would change through 100 cycles corresponding to the fine signal for each 180 degrees of revolution of the resolver input shaft. In this way the basic circuit shown in FIGURE 12 may be duplicated in parallel to provide various degrees of revolution for a given displacement of the input shaft.

It is understood that the difference between the number of pattern elements of the two sections of the resolver may be different from that described in this embodiment in which case the coarse output signal would have a corresponding change in the numerical relationship to the fine output signal.

While the particular resolver embodiment next to be described is of linear displacement type, it is to be understood that the principles of resolver construction and operation in accordance with this embodiment of the invention are applicable also to resolvers of angular displacement type, wherein the inductor patterns are circularly disposed and mounted for relative rotary movement, just as the angular resolver described above could also be adapted to measure linear displacement.

Figure 13:
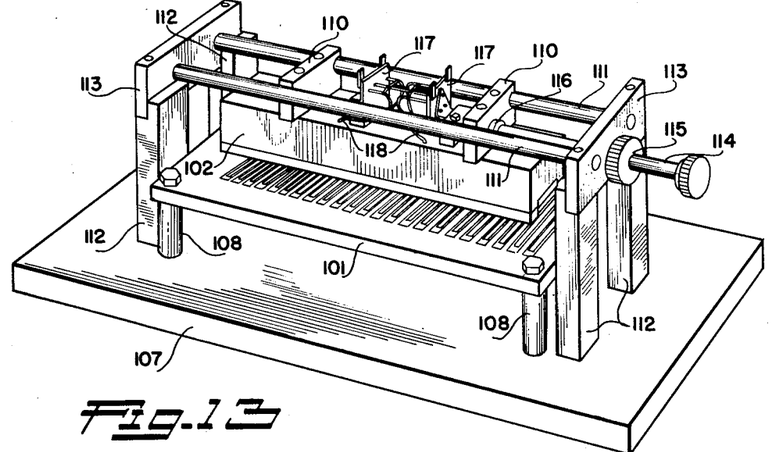
FIGURE 13 is a perspective view of a resolver for translating linear mechanical displacement to phase modulated electrical output signals in accordance with the invention.
Figure 14:
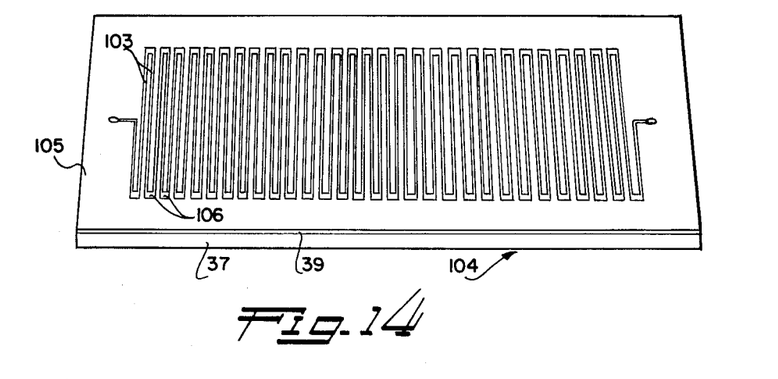
FIGURES 14 and 15 are perspective views of the stationary driver element and the movable sensor element respectively, of the resolver of FIGURE 13.

Referring now to FIGURE 13, the principal elements comprise two conductor patterns. Coupling between the relatively movable element 102 and the relatively stationary element 101 is, in this embodiment, electromagnetic. The sensor pattern comprises a transmission line conductor 103 interconnected and generally disposed as shown in FIGURE 14 so as to produce a phase shifted carrier whose displacement is a function of the input (spatial) displacement. This is a current supply device dependent for its operation on the proper distribution of its elementary flux linkages.

With reference to FIGURE 14, the driver element designated generally by reference numeral 104 comprises a plurality of parallel coplanar conductor elements 103 extending back and forth in zig-zag fashion across a non-conductor base plate 105 and interconnected to form a series circuit. There are 100 conductor elements in this particular embodiment selected for illustration, thus comprising 50 "pole pairs" or pairs of adjacent conductors through which current flow will be generally oppositely directed.

The over-all dimensions of the driver and the dimensions of its components may vary over a wide range, dependent on a particular application for which the resolver is intended and also dependent on the desirable mode of operation for the particular application. The driver circuit shown for purposes of illustration may be five inches in length, with the wave pattern of its conductor elements having a peak-to-peak amplitude of two inches, a conductor width of 0.025 inch, and a spacing between conductors of 0.025 inch. At the peaks of conductor elements 103, connector strips 106 form a series connection between elements. The width of these strips may be varied to provide capacitive compensation for signal variation along the length of the driver should such a correction be found desirable during calibration or use.

Figure 15:
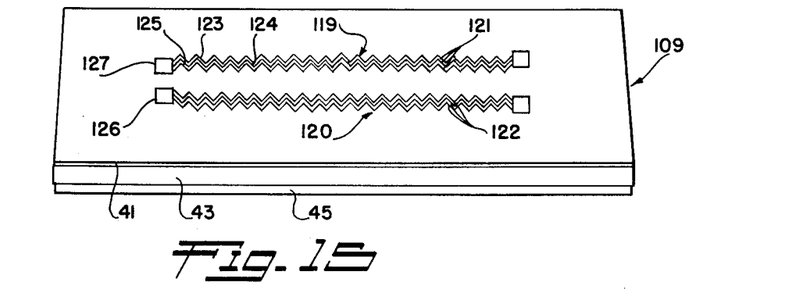

The driver and sensor elements may be provided with any suitable mounting arrangement permitting linear movement of the elements with respect to each other. One such mounting is illustrated in FIGURE 13, wherein the driver 101 is shown as fixedly supported above a base plate 107 as by pedestal means 108 one disposed at each of the four corners of the driver. Sensor elements 109 of FIGURE 15 are shown mounted for linear movement above and parallel to the driver by a pair of carriage elements 110 fixed to the sensor mounting plate 102 and slidable on a pair of guide rods 111. Rods 111 may be fixedly supported by any suitable means such as a post 112 and cross bars 113. A push rod 114 may be provided for connecting sensor 109 to the object whose movement is to be measured. This push rod may be slidable in an insulating bushing 115 mounted to one of the cross bars 113, or if desired, a push rod and bushing 115 may have threaded inter-engagement with each other. In this case, rotary coupling means are provided shown at 116 to permit free rotation of the push rod with respect to the sensor. Thus, depending on whether push rod 114 has slidable or threaded engagement in bushing 115, the resolver may be used for measurement of either linear or rotary displacement.

As shown in FIGURE 13 suitable connector lugs 117 may be mounted to the sensor mounting plate 102 so as to provide convenient means for connection to the sensor output leads 118. While in the example chosen the resolver may be arranged with the driver fixed and the sensor movable, it is to be understood that the resolver may be arranged with the driver movable and the sensor fixed.

Several embodiments of the sensor element may be constructed having various configurations and a wide range of overall dimensions. The sensor selected as an example and generally designated by reference numeral 109 in FIGURE 15 may consist of two circuits 119 and 120 each comprising a plurality of series connecting conductor elements 121 and 122 angularly disposed with respect to each other so as to form a plurality of zig-zag conductor paths 123, 124 and 125 generally parallel and spatially in phase with each other. These conductor paths may be electrically connected in parallel by conductor strips 126 and 127 as shown. In the particular embodiment selected for illustration, each conductor path 123, 124 and 125 defines a triangular wave. Two identical circuits are used which lie generally parallel and are phase-displaced 180 degrees in space for providing a balanced output of the electromagnetically coupled signals and to permit a cancellation of the electrostatically coupled signals.

The first step in calibrating and using a resolver is to determine a carrier drive signal wave length for the driver such that one wave length along the driver will effectively be just equal to the length of the sensor. Alternatively, the resolver may be operated at a frequency at which the length of the sensor will be just equal to one-half wave length along the driver. Due to the lack of symmetry, this mode of operation increases the possibility of systematic error due to inaccuracy in construction. However, this systematic error may be minimized by use of a configuration involving a pair of identical balanced drivers and a pair of identical parallel connected sensors one-half wave length long.

Figure 16:
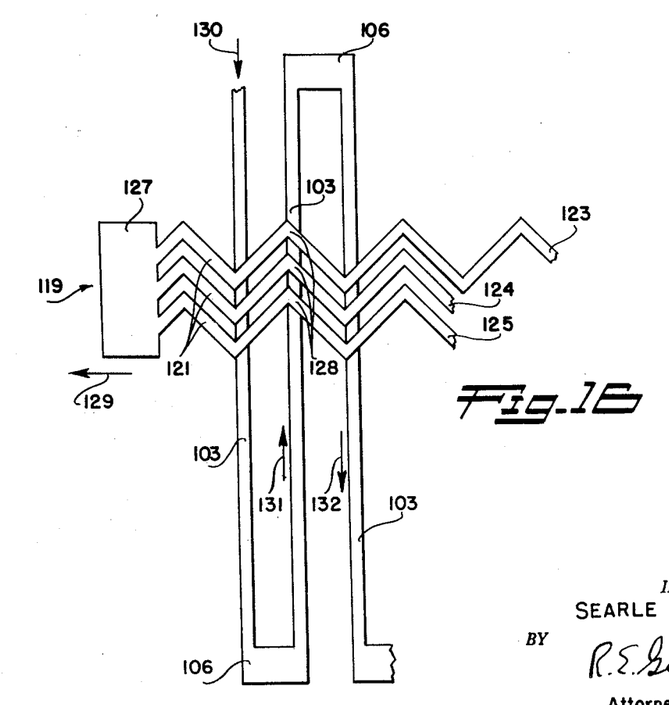
FIGURE 16 is a diagrammatic illustration of the relationship between the sensor and driver patterns for one part of the linear resolver at a given position.

As best shown in FIGURE 16, the total area of the portion of conductor elements 121 overlaying conductor element 103 remains constant, at least to a first order, regardless of the relative position of one with the other. Therefore, the total amount of electromagnetic coupling between conductor elements 121 and element 103 remains fixed. Since the same is true for the portion of conductor elements 128 and element 103, the overall degree of coupling between conductor paths 123, 124 and 125 with conducting element 103 is substantially constant regardless of their relative position along a line of translation as indicated by arrow 129.

With the high frequency applied to this apparatus, sufficient coupling for practical use is obtained.

Now assuming that the sensor conductor 119 moves relative to element 103 in a direction indicated by arrow 129, and further assuming that the reference carrier signal is propagated in conductor element 103, in the direction indicated by arrow 130, then conductor elements 121 will appear to move in a direction opposite the direction of arrow 130 and coupling between conductor elements 121 and element 103 will occur at an earlier time as indicated by a relative phase shift in a leading direction. Similarly conductor elements 128 will appear to move in an opposite direction to conductor elements 121 but since the propagation of the reference carrier in element 103 also appears to be traveling in a direction opposite that of either adjacent elements 103, as shown by arrows 131 and 132, the net effect remains one of a relative phase lead for a mechanical displacement of the sensor circuit 119 in a direction relative to the stator indicated by arrow 129. It is understood that the operation of circuit element 120 is similar to that of circuit 119 and the two constitute a balanced pair.

Referring now to FIGURE 13, the sensor 102 may be displaced by movement of push rod 114 and it will be observed that 360 degree electrical phase shift results as a continuous variation or function of the linear displacement and that the cycle repeats in each unit displacement of the sensor which corresponds to each 0.1 inch displacement in the particular embodiment described for purposes of illustration. It will also be observed that the variation of phase angle with position, i.e., the angle of lead or lag of the output with respect to the input reference signal, will be sinusoidal. Since it is readily possible with conventional phase comparison apparatus to resolve the 360 degree phase shift per pole pair into at least 100 parts, and since there are 20 pole pairs over the two inch length of the sensor, this gives an overall resolution of 2000 parts for a two inch displacement of the sensor.

It will be understood that in practice the sensor is restricted in its movement so that no portion thereof moves beyond the ends of the driver. For best accuracy, the sensor is limited to a range of movement centered directly over the midpoint of the driver, thus assuring that the distributed capacitance between the sensor and driver remains substantially constant even with movement of the sensor. The amplitude of the output signal then will be substantially constant and the output intelligence entirely in the phase domain.

As noted previously, it is desirable to eliminate standing waves since these contribute to systematic errors in indication. The reduction in standing wave ratio is achieved by the use of a tuned resistance-capacitance circuit across the driver.

It is to be noted that since a large reactive component in the characteristic impedance may introduce frequency errors, the selection of suitable materials (particularly dielectrics) and dimensions and geometry of components is important. Also, the effect of selection of materials must be related to their influence on attenuation, temperature characteristics and velocity of propagation.

Since the carrier signal for powering the resolver is chosen to have a wave length equal to (or a submultiple of) the length of the sensor a capacity probe may be used to pick off a signal from the end strips 106 of conductor pattern 103 which will indicate a coarse phase shift for preventing ambiguity in reading the fine phase shift obtained over each pair of parallel elements of conductor 103. This probe may be mounted on the movable element 102 so as to couple only to end strips 106.

Various modifications are contemplated by those skilled in the are without departing from the spirit and scope of the invention as hereinafter defined by the appended claims.

What is claimed is:

1. A device for providing an output signal proportional to mechanical displacement, said device comprising in combination a first member, a second member, said second member being displaceable relative to said first member in an amount directly proportional to said mechanical displacement to be measured, said first member having first conducting means positioned thereon, said second member having second conducting means including a plurality of conducting elements positioned thereon, said plurality of conducting elements having complementary contours, said first and second conducting means having electrically coupled overlapping areas, said overlapping areas being constant in amount throughout said mechanical displacement, said coupled areas producing a signal whose phase is directly proportional to mechanical displacement and whose amplitude is substantially independent of mechanical displacement, and means to produce an output signal from said second conducting means, said output signal having substantially constant amplitude and having a phase which is shifted in an amount directly proportional to said mechanical displacement.

2. The combination of claim 1 wherein the complementary contours of said plurality of conducting elements are sinusoidal in form.

3. The combination of claim 1 wherein both said first and second members have a plurality of conducting elements having complementary areas and wherein said first member is fed with a voltage which is constant in amplitude.

4. The combination of claim 1 wherein said means to produce an output signal comprises a phase detector means.

5. The combination of claim 1 wherein said plurality of conducting elements have opposed edge contours extending along said second member and defining a gap of substantially constant width.

6. The combination of claim 5 wherein said gap is sinusoidal in form to define opposed edge contours on said conducting elements sinusoidally in form.

7. In a device for providing an output signal shifted in phase with respect to a reference signal in proportion to a mechanical input; a pair of relatively movable members; first conducting means along one of said members having its length compressed into a cyclic pattern, said first conducting means comprising four conducting elements arranged side by side in pairs and each pair being separated by a substantially sinusoidal dielectric space, one of said spaces being out of phase with the other of said spaces, and means for connecting said elements in phase quadrature; second conducting means mounted on the other of said members for movement relative to said first conducting means, said second conducting means comprising bars overlying equal areas of said conducting elements and electrically coupled thereto to provide an output signal of substantially constant amplitude whose phase is shifted relative to the phase of the reference signal by an amount proportional to mechanical displacement between said members.

8. A displacement measuring device comprising two relatively movable members, conducting means mounted on one of said members and comprising a plurality of conducting elements extending in pairs side by side along said one member, said elements being continuously variable in width along said one member and the elements of each pair being separated by a dielectric space of fixed amount, means for imparting input signals to said elements which are out-of-phase with one another, and means movable with said other member along said conducting means and electrically coupled to said elements to obtain a resultant output signal changing in phase in proportion to the mechanical displacement between said members.

9. A displacement measuring device as defined in claim 8 wherein said conducting means comprises four conducting elements arranged in pairs, said dielectric space separating each pair being of substantially sinusoidal shape, the space for one pair being out-of-phase with the space for the other pair.

10. A displacement measuring device having an output signal shifted in phase with respect to a reference signal in proportion to a mechanical input comprising relatively movable members, conducting means mounted on one of said members and comprising four conducting elements arranged in pairs, the elements of each pair being separated by a substantially sinusoidal dielectric space and the spaces for each pair being out-of-phase by 90 electrical degrees, means for imparting input signals to the elements which are 180 electrical degrees out-of-phase in the elements of each pair and are in phase quadrature in the elements of both pairs, a conducting strip located between said pairs and conducting strips located on opposite sides of said pairs, and means movable with said other member along said conducting means and coupled thereto to provide an output signal, said coupled means comprising a plurality of bars overlying each of said pairs and transverse to said elements, the bars overlying one pair being in line with the bars overlying the other pair and all the bars having a width one-half the wave length of said sinusoidal spaces, an output strip opposite each of said conducting strips and connected with said bars to couple the output signal to said conducting strips, the phase of said output signal with respect to said reference signal being the resultant of the coupled signals from the areas of the elements covered by said bars.

11. A displacement measuring device as defined in claim 10 having a second separate conducting means and second means coupled thereto, the wave length of the sinusoidal spaces of said second conducting means being different from that of the spaces of said first conducting means so that the phase of the output signal from one of said conducting means lags that of the other output signal during relative movement of said members.

12. A device for providing an output signal proportional to mechanical displacement, said device comprising in combination a first member, a second member, said second member being displaceable relative to said first member in an amount directly proportional to said mechanical displacement to be measured, said first member having first conducting means positioned thereon in a first plane, said second member having second conducting means positioned thereon in a second plane parallel to said first plane, said first and second conducting means having dielectrically coupled overlapping areas, said first conducting means overlapping a constant area on said second conducting means continuously throughout said mechanical displacement, said coupled areas producing a signal whose phase is directly proportional to mechanical displacement and whose amplitude is substantially independent of mechanical displacement, and means to produce an output signal from said second conducting means, said output signal having substantially constant amplitude and having a phase which is shifted in an amount directly proportional to said mechanical displacement.

13. The combination of claim 12 wherein said second conducting member includes a plurality of conducting elements sinusoidal in form.

14. The combination of claim 12 wherein said second member includes a plurality of conducting elements having opposed edge contours extending along said second member and defining a gap of substantially constant width.

15. The combination of claim 12 wherein said first member is supplied with a carrier voltage which is constant in amplitude.

16. The combination of claim 12 wherein said means to produce an output signal comprises phase detector means.

References Cited in the file of this patent
UNITED STATES PATENTS

| | | |
|---|---|---|
| 2,650,352 | Childs | Aug. 25, 1953 |
| 2,671,892 | Childs | Mar. 9, 1954 |
| 2,674,729 | Carter | Apr. 6, 1954 |
| 2,765,459 | Winter | Oct. 2, 1956 |
| 2,769,969 | Comstock | Nov. 6, 1956 |
| 2,799,835 | Tripp | July 16, 1957 |